United States Patent
Oyamada

(10) Patent No.: US 11,416,246 B2
(45) Date of Patent: Aug. 16, 2022

(54) INFORMATION PROCESSING APPARATUS, ANALYSIS SYSTEM, ANALYSIS METHOD, AND NON-TRANSITORY COMPUTER READABLE MEDIUM STORING ANALYSIS PROGRAM

(71) Applicant: NEC Corporation, Tokyo (JP)

(72) Inventor: Masafumi Oyamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/271,913

(22) PCT Filed: Sep. 3, 2018

(86) PCT No.: PCT/JP2018/032670
§ 371 (c)(1),
(2) Date: Feb. 26, 2021

(87) PCT Pub. No.: WO2020/049622
PCT Pub. Date: Mar. 12, 2020

(65) Prior Publication Data
US 2021/0318867 A1    Oct. 14, 2021

(51) Int. Cl.
*G06F 8/75* (2018.01)
*G06N 20/00* (2019.01)

(52) U.S. Cl.
CPC .............. *G06F 8/75* (2013.01); *G06N 20/00* (2019.01)

(58) Field of Classification Search
CPC ....................................................... G06F 8/75
See application file for complete search history.

(56) References Cited

U.S. PATENT DOCUMENTS

2005/0044073 A1    2/2005 Inokuchi
2006/0004528 A1    1/2006 Uehara et al.
(Continued)

FOREIGN PATENT DOCUMENTS

JP    2005-063277 A    3/2005
JP    2006-018693 A    1/2006
(Continued)

OTHER PUBLICATIONS

International Search Report for PCT Application No. PCT/JP2018/032670, dated Nov. 20, 2018.
(Continued)

*Primary Examiner* — Jae U Jeon
(74) *Attorney, Agent, or Firm* — Sughrue Mion, PLLC

(57) ABSTRACT

An information processing apparatus (1) includes a storage unit (11) that stores knowledge information (111) containing a relationship regarding the correspondence between a plurality of types of element information (1111 to 111n) to be used for referring to a specified element value and conceptual information (1110) indicating a concept of the element value, an adding unit (12) that adds, to each of a plurality of graphs representing a processing structure in each of a plurality of source codes where any one of the element information (1111 to 111n) is described, the conceptual information (1110) identified from the element information corresponding to each node in the graph based on the knowledge information (111) as attribute information related to the node, and an extraction unit (13) that extracts a subgraph common to the graphs after the adding based on the conceptual information (1110).

12 Claims, 15 Drawing Sheets

(56) References Cited

U.S. PATENT DOCUMENTS

| | | | |
|---|---|---|---|
| 2014/0310813 A1* | 10/2014 | Murthy | G06F 11/3644 726/25 |
| 2016/0188885 A1* | 6/2016 | Lee | G06F 21/577 726/25 |
| 2017/0308380 A1 | 10/2017 | Lee et al. | |
| 2018/0189634 A1* | 7/2018 | Abdelaziz | G06N 3/04 |
| 2018/0240019 A1 | 8/2018 | Sato et al. | |
| 2019/0215545 A1* | 7/2019 | Gupta | H04N 21/4884 |

FOREIGN PATENT DOCUMENTS

| | | |
|---|---|---|
| JP | 2007-249264 A | 9/2007 |
| JP | 2011-096082 A | 5/2011 |
| JP | 6338036 B1 | 6/2018 |

OTHER PUBLICATIONS

Kuramochi, M. and Karypis, G.: Frequent Subgraph Discovery, in Proceedings of the 2001 IEEE International Conference on Data Mining, Nov. 29-Dec. 2, 2001, San Jose, California, USA, pp. 313-320.

\* cited by examiner

2111

```
import pandas as pd
data = {"staff number": [001, 002],
        "age": [28, 35],
        "bodyweight": [58, 66],
        "bodyheight": [180, 172]}
df = pd.DataFrame(data)

.
   .
   .

df["feat_BMI"] = df["bodyweight"] / df["bodyheight"] ** 2    C1

```
import pandas as pd
df = pd.DataFrame(data=[[1, 30, A, 60, 175],
                        [2, 40, B, 70, 170],
                        [3, 50, O, 68, 168]],
            columns=["userID", "age", "bloodtype",
                     "weight", "height"])
   .
   .
   .
df["bmi"] = df["weight"] / df["height"] ** 2      C2
model.train(df.values)
   .
   .
   .
```

Fig. 5

```
If data has <Weight> and <Height>:       217a       217b
    data["BMI"] = data["Weight"] / data["Height"] ** 2
```

Fig. 15

INFORMATION PROCESSING APPARATUS, ANALYSIS SYSTEM, ANALYSIS METHOD, AND NON-TRANSITORY COMPUTER READABLE MEDIUM STORING ANALYSIS PROGRAM

This application is a National Stage Entry of PCT/JP2018/032670 filed on Sep. 3, 2018, the contents of all of which are incorporated herein by reference, in their entirety.

TECHNICAL FIELD

The present invention relates to an information processing apparatus, an analysis system, an analysis method, and an analysis program and, particularly, relates to an information processing apparatus, an analysis system, an analysis method, and an analysis program for extracting processing common to a plurality of source codes.

BACKGROUND ART

Patent Literature 1 discloses a technique of extracting a set of frequent subgraphs from a plurality of objects represented by a graph structure. Patent Literature 2 discloses a technique of guessing the number and data type of arguments for a function in a syntax tree obtained by parsing a source code of a program. Patent Literature 3 discloses a technique of generating a model indicating regularity between the semantics of a column in a table and the semantics of the table and estimating the semantics of an input table from the semantics of a column in the input table by using this model. Note that Non Patent Literature 1 discloses a technique related to mining of a frequently appearing subgraph.

CITATION LIST

Patent Literature

PTL1: Japanese Unexamined Patent Application Publication No. 2005-063277
PTL2: Japanese Unexamined Patent Application Publication No. 2007-249264
PTL3: Japanese Patent No. 6338036

Non Patent Literature

NPL1: Kuramochi, M. and Karypis, G.: Frequent Subgraph Discovery, in Proceedings of the 2001 IEEE International Conference on Data Mining, 29 Nov.-2 Dec. 2001, San Jose, Calif., USA, pp. 313-320 (2001)

SUMMARY OF INVENTION

Technical Problem

A large number and a large variety of software programs have been developed recently, and their source codes are accumulated in large amounts. Thus, when developing a program for a new case, the need for reusing a part of a source code in a past similar case is increasing. Therefore, one approach is to analyze a large amount of accumulated source codes, extract common processing, and find a reusable code. However, this approach has a problem that it is difficult to extract reusable information (knowledge, know-how, etc.) by human work from a large amount of source codes. This is because, if a developer or section is different, a description in a source code is different in variable name or specific description for implementation even when processing (arithmetic expression or algorithm) is logically the same.

In the technique according to Patent Literature 1, an intended object is a chemical formula or screen transition, and it is not intended for a source code. Further, because the technique according to Patent Literature 1 extracts a result only in a graphical form, its accuracy is not high enough. Further, in the technique according to Patent Literature 2, a syntax tree is based on lexical analysis, and a difference in description between different source codes is recognized as different processing. Further, the technique according to Patent Literature 3 is not intended for a source code. Note that the technique according to Non Patent Literature 1 is not applicable to the case where a variable name is different even when processing is the same between a plurality of source codes, for example.

The present disclosure has been accomplished to solve the above problems and an object of the present invention is thus to provide an information processing apparatus, an analysis system, an analysis method, and an analysis program for efficiently extracting reusable information from a plurality of source codes.

Solution to Problem

An information processing apparatus according to a first aspect of the present disclosure includes a storage unit configured to store knowledge information containing a relationship regarding the correspondence between a plurality of types of element information to be used for referring to a specified element value and conceptual information indicating a concept of the element value, an adding unit configured to add, to each of a plurality of graphs representing a processing structure in each of a plurality of source codes where any one of the element information is described, the conceptual information identified from the element information corresponding to each node in the graph based on the knowledge information as attribute information related to the node, and an extraction unit configured to extract a subgraph common to the graphs after the adding based on the conceptual information.

An analysis system according to a second aspect of the present disclosure includes a storage apparatus configured to store knowledge information containing a correspondence relationship between a plurality of types of element information to be used for referring to a specified element value and conceptual information indicating a concept of the element value, an adding unit configured to add, to each of a plurality of graphs representing a processing structure in each of a plurality of source codes where any one of the element information is described, the conceptual information identified from the element information corresponding to each node in the graph based on the knowledge information as attribute information related to the node, and an extraction unit configured to extract a subgraph common to the graphs after the adding based on the conceptual information.

An analysis method according to a third aspect of the present disclosure, the analysis method performed by a computer includes adding, to each of a plurality of graphs representing a processing structure in each of a plurality of source codes where any one of a plurality of types of element information to be used for referring to a specified element value is described, based on knowledge information containing a correspondence relationship between the plurality of types of element information and conceptual information indicating a concept of the element value, the conceptual information identified from the element information corresponding to each node in the graph as attribute information related to the node, and extracting a subgraph common to the graphs after the adding based on the conceptual information.

An analysis program according to a fourth aspect of the present disclosure causes a computer to execute processing of adding, to each of a plurality of graphs representing a processing structure in each of a plurality of source codes where any one of a plurality of types of element information to be used for referring to a specified element value is described, based on knowledge information containing a correspondence relationship between the plurality of types of element information and conceptual information indicating a concept of the element value, the conceptual information identified from the element information corresponding to each node in the graph as attribute information related to the node, and processing of extracting a subgraph common to the graphs after the adding based on the conceptual information.

Advantageous Effects of Invention

According to the present invention, there are provided an information processing apparatus, an analysis system, an analysis method, and an analysis program for efficiently extracting reusable information from a plurality of source codes.

BRIEF DESCRIPTION OF DRAWINGS

FIG. 4 is a view showing an example of a source code written using a specified data structure according to the second example embodiment.
FIG. 5 is a view showing an example of another source code written using a specified data structure according to the second example embodiment.
FIG. 15 is a view showing an example of an extracted analysis rule according to the third example embodiment.

DESCRIPTION OF EMBODIMENTS

Example embodiments of the present disclosure will be described hereinafter with reference to the drawings. In the figures, the identical reference symbols denote identical structural elements and the redundant explanation thereof is omitted where needed.

First Example Embodiment

Figure 1:
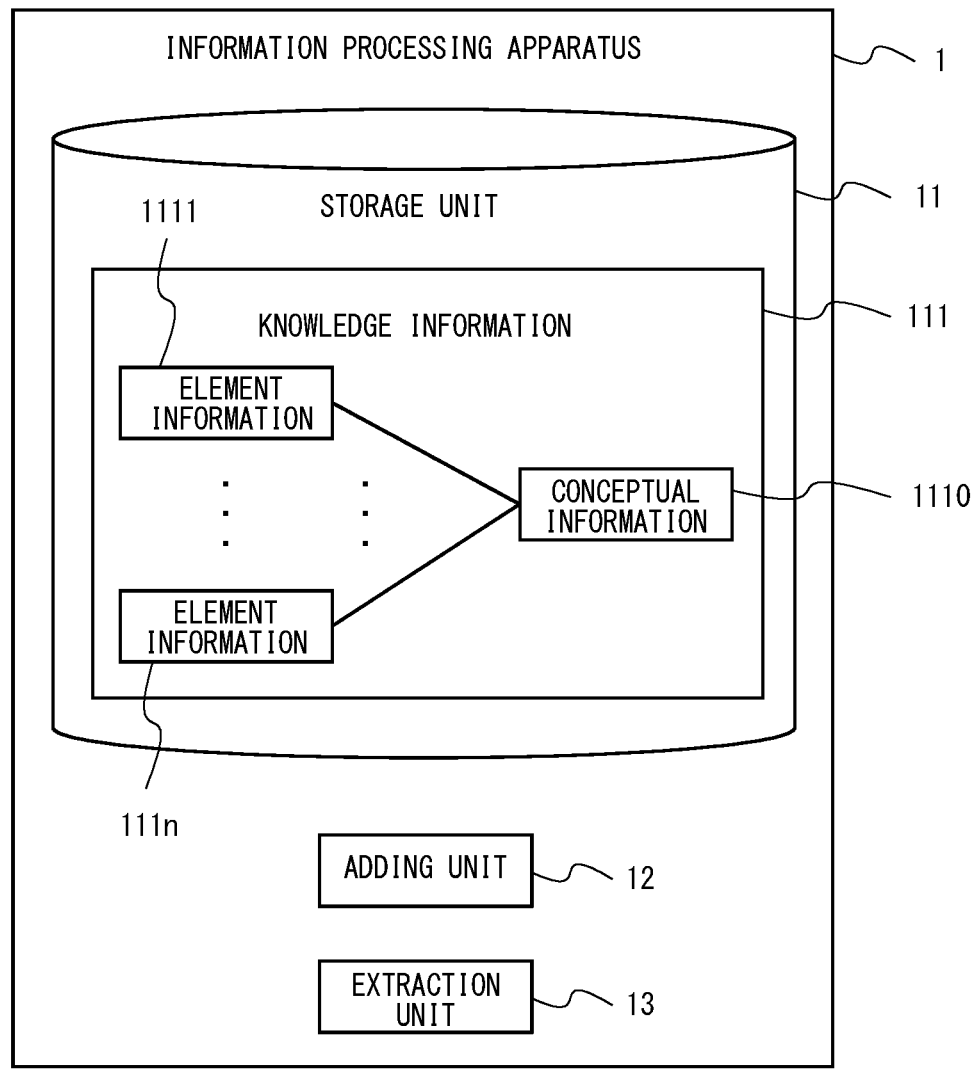
FIG. 1 is a block diagram showing the configuration of an information processing apparatus according to a first example embodiment.

FIG. 1 is a block diagram showing the configuration of an information processing apparatus 1 according to a first example embodiment. The information processing apparatus 1 is a computer that performs analysis for extracting a part where substantially the same processing is implemented among a plurality of source codes. Note that the information processing apparatus 1 may be composed of two or more computers. "Substantially the same processing" indicates a block of program codes for logically the same processing (arithmetic expression or algorithm), which are different in variable name or specific description for implementation.

The information processing apparatus 1 includes a storage unit 11, an adding unit 12, and an extraction unit 13. The storage unit 11 is a storage apparatus such as a hard disk or a flash memory, and it stores at least knowledge information 111. The knowledge information 111 is information containing a relationship regarding the correspondence (correspondence relationship) between a plurality of types of element information 1111 to 111n (n is a natural number of 2 or more) and conceptual information 1110. Each of the element information 1111 and the like is information to be used for referring to a specified element value. The element information 1111 and the like are a variable name, a property (attribute) name, a structure or class member variable name and the like described in a source code of a computer program, for example. Alternatively, the element information 1111 and the like are array, list or matrix index information, a key character string, an element number, an element name, a column name and the like. Thus, the element information 1111 and the like are information of a character string or a numerical value. It is assumed that the element information 1111 to 111n are different values. The conceptual information 1110 is information of a character string or a numerical value indicating the concept of an element value. The conceptual information 1110 is a character string indicating the semantics of an element value, for example. The element information 1111 to 111n are associated with the same conceptual information 1110. For example, when the element information 1111 is "Name" and the element information 1112 is "customer name", the conceptual information 1110 associated with those information is "name". The knowledge information 111 is information or database that defines the relationship of a plurality of words such as a knowledge base, a word network, and dictionary information, including the above-described correspondence relationship. The knowledge information 111 may be created in advance based on human knowledge, or may be generated by machine learning based on specified learning data.

The adding unit 12 adds, to each of a plurality of graphs representing a processing structure in each of a plurality of source codes, the conceptual information 1110 that is identified from the element information 1111 and the like corresponding to each node in the graph as attribute information related to this node based on the knowledge information 111. It is assumed that any of the element information 1111 and the like is described in each of the plurality of "source codes". Further, the "graph" is an implementation of a graph by a graph theory, and it is composed of a "node group" that are a plurality of nodes and an "edge group" indicating a connection relationship between nodes. Further, a "node" has one or more attribute information. Particularly, the graph according to this example embodiment represents a processing structure in a source code. The graph according to this example embodiment may be an abstract syntax tree or the like, for example, though not limited thereto. The "attribute information related to this node" indicates attribute information of any one of this "node", a "parent node" to which this node belongs, and a "node group" including this node and the parent node. The "element information corresponding to a node" indicates the element information that is set as the attribute information of any one of this node, a parent node to which this node belongs, and a node group including this node and the parent node.

The extraction unit 13 extracts a subgraph that is common to graphs in which the conceptual information has been added to the attribute information by the adding unit 12 based on the added conceptual information 1110. The subgraph is a certain node or a node group in a graph. The common subgraph indicates a subgraph where a set of nodes included in a node group or a connection relationship between nodes is common.

Figure 2:
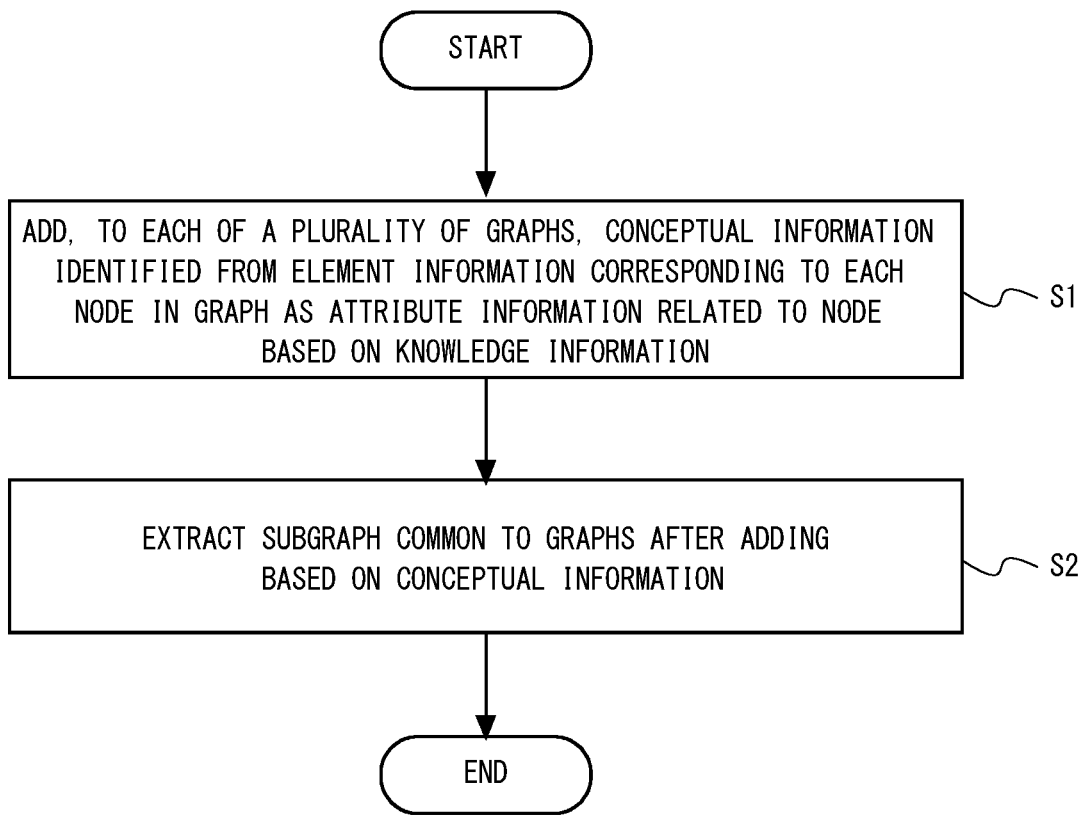
FIG. 2 is a flowchart showing the flow of an analysis method according to the first example embodiment.

FIG. 2 is a flowchart showing the flow of an analysis method according to the first example embodiment. First, the adding unit 12 inputs a plurality of graphs representing a processing structure in each of a plurality of source codes. Then, the adding unit 12 refers to the knowledge information 111 in the storage unit 11 and adds, to each graph, the conceptual information 1110 that is identified from the element information 1111 and the like corresponding to each node as the attribute information related to this node (S1). For example, the adding unit 12 identifies the conceptual information 1110 associated with the element information that is set as the attribute information to the node from the correspondence relationship in the knowledge information 111. Then, the adding unit 12 adds the identified conceptual information 1110 as the attribute information related to this node. Further, the adding unit 12 performs such adding for each of the plurality of graphs.

Next, the extraction unit 13 extracts a subgraph that is common to the graphs to which the conceptual information is added in Step S1 based on the conceptual information 1110 (S2).

Note that the information processing apparatus 1 includes a processor and a memory as elements not shown in the figure. Further, a storage apparatus such as the storage unit 11 stores a computer program in which processing of the analysis method according to this example embodiment is implemented. The processor loads the computer program from the storage unit 11 or the like to the memory and executes this computer program. The processor thereby implements the functions of the adding unit 12 and the extraction unit 13.

Alternatively, each of the adding unit 12 and the extraction unit 13 may be implemented by dedicated hardware. Further, some or all of the elements of each apparatus may be implemented by general-purpose or dedicated circuitry, processor, or a combination of them. They may be configured using a single chip, or a plurality of chips connected through a bus. Some or all of the elements of each apparatus may be implemented by a combination of the above-described circuitry or the like and a program.

In the case where some or all of the elements of the information processing apparatus 1 are implemented by a plurality of information processing apparatuses, circuitry and the like, the plurality of information processing apparatuses, circuitry and the like may be centralized or dispersed. For example, the information processing apparatuses, circuitry and the like may be implemented as a form in which components are connected through a communication network, such as a client-server system or a cloud computing system.

In a program for various data analysis, for example, it is often the case that substantially the same processing is implemented in different source codes. For example, there is a case where the details of processing, such as an arithmetic expression, a processing logic or an algorithm, are common. However, in the case where a developer of a program is different or a section of development is different, a variable name or a specific description is generally different (orthographic variants) at a source code level. Therefore, simply comparing graphs generated from different source codes only results in a failure to extract a common subgraph because the element information is different.

In this example embodiment, with use of the knowledge information 111, when the element information is different but is associated with the same conceptual information, a common subtree is extracted by using the conceptual information as a clue. A code corresponding to a common subtree shows high frequency of implementation, and therefore it is likely to be reused. Further, by comparing the structure of nodes and edges in graphs by using the conceptual information as a clue, the common subtree is extracted efficiently and highly accurately. This example embodiment thereby enables efficient extraction of reusable information from a plurality of source codes.

Second Example Embodiment

A second example embodiment is an application example of the above-described first example embodiment. An analysis system according to the second example embodiment is a computer system that performs analysis for extracting a part where substantially the same processing is implemented in a plurality of source codes. This analysis system at least includes a storage apparatus, an adding unit, and an extraction unit. The storage apparatus, the adding unit, and the extraction unit may be in any form as long as they have the same functions as the storage unit 11, the adding unit 12, and the extraction unit 13 according to the first example embodiment described above.

Further, when a description in the source code contained in each node is the element information, the adding unit preferably identifies the conceptual information associated with this element information in the knowledge information, and adds this identified conceptual information as the attribute information of any one of this node, a parent node to which this node belongs, and a node group including this node and the parent node. This enables adding more appropriate conceptual information.

Further, it is assumed that the element information is an attribute name described in a specified source code for referring to the element value, and the conceptual information is a character string indicating the semantics of the element value. It is also assumed that the knowledge information is a semantic inference model indicating regularity between the attribute name and the semantics, which is obtained in advance by machine learning based on learning data containing a plurality of types of attribute names and the semantics. In this case, the adding unit preferably adds a character string indicating the semantics obtained by inputting the attribute name in the source code corresponding to each node to the semantic inference model as the attribute information related to this node. This enables extraction of commonality in practical details of processing regardless of a description in the source code.

Further, it is assumed that each of the plurality of source codes is written using a specified data structure that contains the element information as an element identifiable as an attribute name. In this case, it is preferred to further include a type determination unit that determines a data type of the data structure from each of the plurality of source codes and adds type information indicating the determined data type to the attribute information related to the corresponding node. Then, it is preferred that the extraction unit extracts the subgraph while also taking this type information into consideration. The extraction accuracy of the subgraph is thereby improved even when a source code is written in a program language with no need of type declaration.

Further, it is preferred that the adding unit identifies the conceptual information based on a node where the type information is added by the type determination unit, and adds the identified conceptual information as the attribute information related to this node. This enables more accurately identifying the conceptual information.

Further, it is preferred that the extraction unit extracts, as the subgraph, a set of nodes where the positional relationship of the plurality of conceptual information items added as the attribute information is common to the graphs after the adding. The subgraph thereby becomes a certain level of size, which enables reuse of more specific processing.

Further, the extraction unit preferably counts the number of appearances of the subgraph in the plurality of graphs. This enables easy grasping of frequent processing when a plurality of subgraphs are extracted, which enhances reuse.

Further, each of the plurality of graphs is preferably an abstract syntax tree generated from each of the plurality of source codes. This enables extraction of a more effective subgraph by eliminating formal and descriptive differences on programming.

Figure 3:
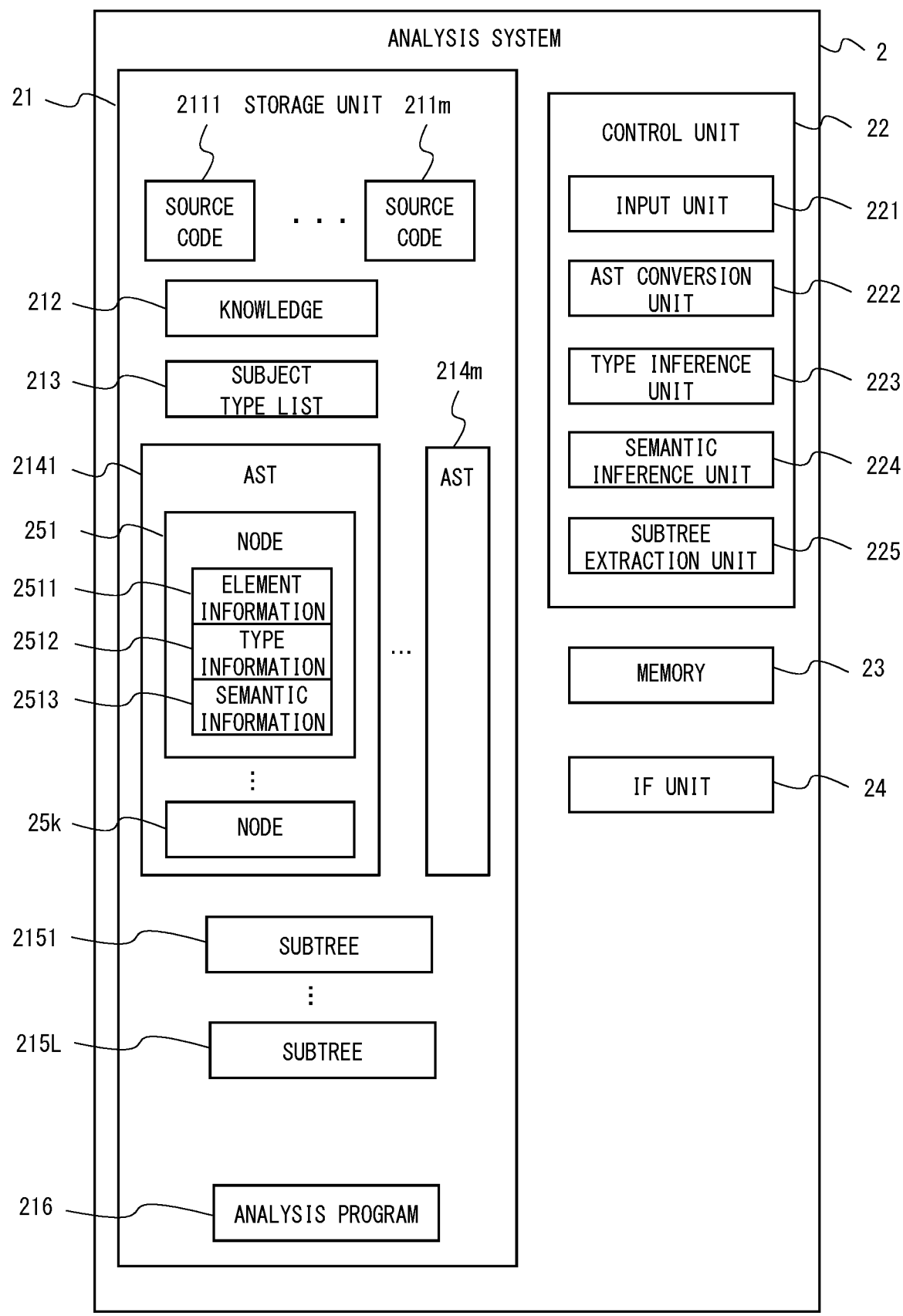
FIG. 3 is a block diagram showing the configuration of an analysis system according to a second example embodiment.

FIG. 3 is a block diagram showing the configuration of an analysis system 2 according to the second example embodiment. The analysis system 2 is implemented by one or a plurality of computer apparatuses. The analysis system 2 includes a storage unit 21, a control unit 22, a memory 23, and an IF (InterFace) unit 24.

The storage unit 21 is a storage apparatus such as a hard disk or a flash memory. The storage unit 21 stores source codes 2111 to 211*m* (m is a natural number of 2 or more), a knowledge 212, a subject type list 213, ASTs (Abstract Syntax Trees) 2141 to 214*m*, subtrees 2151 to 215L (L is a natural number of 2 or more), and an analysis program 216.

The source codes 2111 and the like are an example of the plurality of source codes according to the first example embodiment described above. Each of the source codes 2111 and the like is written using a specified data structure containing any of a plurality of types of element information as an element. Note that, however, varieties of the element information are different in at least some of source codes.

FIG. 4 is a view showing an example of the source code 2111 that is written using a specified data structure according to the second example embodiment. In this example, Data Frame type is used as the data structure in the source code 2111. Further, in columns of a variable df in Data Frame type, "staff number", "age", "bodyweight", and "bodyheight" are defined as the element information. In a subject code C1, processing of performing a specified operation using "bodyweight" and "bodyheight" of the variable df and substituting an operation result into columns "feat_BMI" of the variable df is described. Thus, the variable df of the source code 2111 has a data structure containing "staff number", "age", "bodyweight", "bodyheight", and "feat_BMI" as elements.

FIG. 5 is a view showing an example of another source code 2112 written using a specified data structure according to the second example embodiment. In this example, Data Frame type, which is the same as the type used in the source code 2111, is used as the data structure in the source code 2112. Further, in columns of a variable df in Data Frame type, "user ID", "age", "blood type", "weight", and "height" are defined as the element information, and the variable df has them as elements. Note that the variable name of the variable df may be different as a matter of course. In a subject code C2, processing of performing the same operation as the subject code C1 by using "weight" and "height" of the variable df and substituting an operation result into columns "bmi" of the variable df is described. Thus, the variable df of the source code 2112 has a data structure containing "user ID", "age", "blood type", "weight", "height", and "bmi" as elements. Further, in the subject code C2, processing of performing machine learning by using a value of the variable df is also described.

As described above, each of the subject codes C1 and C2 contains processing of calculating BMI as a feature amount. Although some processing is substantially the same between the subject codes C1 and C2, the character string of the element information is different. Further, processing of machine learning is only in the subject code C2. Note that elements information other than element information 2511 and 2512 have a structure similar to those information, and therefore the illustration and description thereof are omitted.

Referring back to FIG. 3, the knowledge 212 is an example of the above-described knowledge information 111, and it is information defining a word network, a correspondence relationship and the like. It is assumed that the knowledge 212 contains a semantic inference model indicating regularity between the attribute name and the semantics (of the element value), which is obtained in advance by machine learning based on learning data containing a plurality of types of column names (element information) indicated as an attribute name by the variable in Data Frame type and the semantics of its element value. The "semantics" is an example of the above-described conceptual information 1110, and it is a character string indicating the semantics or concept of an element value.

It is assumed that, in the knowledge 212, the element information "bodyweight" and "weight" are associated with the conceptual information "Weight". It is also assumed that, in the knowledge 212, the element information "bodyheight" and "height" are associated with the conceptual information "Height". Further, in the knowledge 212, the element information "feat_BMI" and "bmi" are associated with the conceptual information "BMI".

The subject type list 213 indicates a list of data types that are the subject of a semantic inference process, which is described later. The subject type list 213 includes a specified data structure that contains a specified data structure that contains the element information as an element that is identifiable as an attribute name. The specified data stricture is a set of data sequences containing a plurality of elements where an element value corresponding to a specific element can be referred to by element name or index, and it includes a structure and a class. For example, the subject type list 213 may be a Data Frame type, an array, a matrix, a list, and the like.

The ASTs 2141 to 214m are abstract syntax trees, which are an example of the above-described "graph". The AST 2141 is a data structure, which is a tree data structure obtained by eliminating information not related to the semantics of a language and thereby extract (abstract) only information related to the semantics from a normal syntax tree.

The AST 2141 includes a plurality of nodes 251 to 25k (k is a natural number of 2 or more). In the node 251, at least some of element information 2511, type information 2512, and semantic information 2513 is added as attribute information. Thus, there are nodes in which only some of those attribute information is added. Note that, there are cases where the attribute information is added to a node group, which is a set of a plurality of nodes connected with one another. The element information 2511 is an example of the above-described element information 1111 and the like, and it is an attribute name described in a corresponding source code. The type information 2512 is a character string indicating a data type inferred by a type inference process, which is described later. The semantic information 2513 is a character string indicating "semantics" inferred by a semantic inference process, which is described later. Note that nodes 252 to 25k have the same structure as the node 251, and therefore the illustration and description thereof are omitted. Further, the number of ASTs may be equal to or greater than m. For example, when one source code is divided and converted into two or more ASTs, the number of ASTs is greater than m.

The subtrees 2151 to 215L are an example of the above-described common subgraph, and it is a subtree extracted by a subtree extraction process, which is described later. The analysis program 216 is a computer program in which at least the above-described analysis method according to this example embodiment is implemented.

The memory 23 is a non-volatile storage device such as a RAM (Random Access Memory), and it is a storage area for temporarily holding information during operation of the control unit 22. The IF unit 24 is an interface for inputting and outputting information from and to the outside of the analysis system 2. For example, the IF unit 24 receives a user operation through an input device such as a keyboard, a mouse, or a touch panel (not shown), and outputs the received operation details to the control unit 22. Further, the IF unit 24 outputs information to a touch panel, a display device, a printer or the like (not shown) in response to an instruction from the control unit 22.

The control unit 22 is a processor such as a CPU (Central Processing Unit), and controls each component of the analysis system 2. The control unit 22 loads an analysis program 216 from the storage unit 21 to the memory 23, and executes the analysis program 216. The control unit 22 thereby implements the functions of an input unit 221, an AST conversion unit 222, a type inference unit 223, a semantic inference unit 224, and a subtree extraction unit 225. Note that the semantic inference unit 224 is an example of the above-described adding unit 12. Further, the subtree extraction unit 225 is an example of the above-described extraction unit 13.

The input unit 221 acquires source codes 2111 to 211m as input from the storage unit 21. The AST conversion unit 222 converts the source codes 2111 to 211m input by the input unit 221 into ASTs 2141 to 214m, respectively, and store them into the storage unit 21. The type inference unit 223 is an example of the type determination unit, and it determines a data type of a data structure from each of the source codes 2111 to 211m, and adds type information indicating the determined data type to the attribute information of a corresponding node. Specifically, the type inference unit 223 infers the type information 2512 in the node 251 in the ASTs 2141 and the like by specified analysis process, adds this information to the node 251, and stores it into the storage unit 21.

When a description in a source code contained in each node is the element information, the semantic inference unit 224 identifies the semantic information associated with this element information in the knowledge 212, and adds this identified semantic information as the attribute information related to this node. "Related to this node" indicates that it corresponds to any of this node, a parent node to which this node belongs, and a node group including this node and the parent node as described earlier. Particularly, the semantic inference unit 224 adds the semantic information obtained by inputting an attribute name in the source code corresponding to each node to the semantic information model of the knowledge 212 as the attribute information related to this node. Further, the semantic inference unit 224 identifies the semantic information based on the node 251 to which the type information 2512 is added by the type inference unit 223, and adds the identified semantic information as the attribute information related to this node.

The subtree extraction unit 225 extracts, as a subtree, a set of nodes where the positional relationship of a plurality of semantic information added as the attribute information is common to the ASTs to which the semantic information is added by the semantic inference unit 224. Further, the subtree extraction unit 225 preferably extracts the subgraph by taking this type information added by the type inference unit 223 into consideration. The subtree extraction unit 225 counts the number of appearances of the subgraph in the plurality of graphs.

Figure 6:
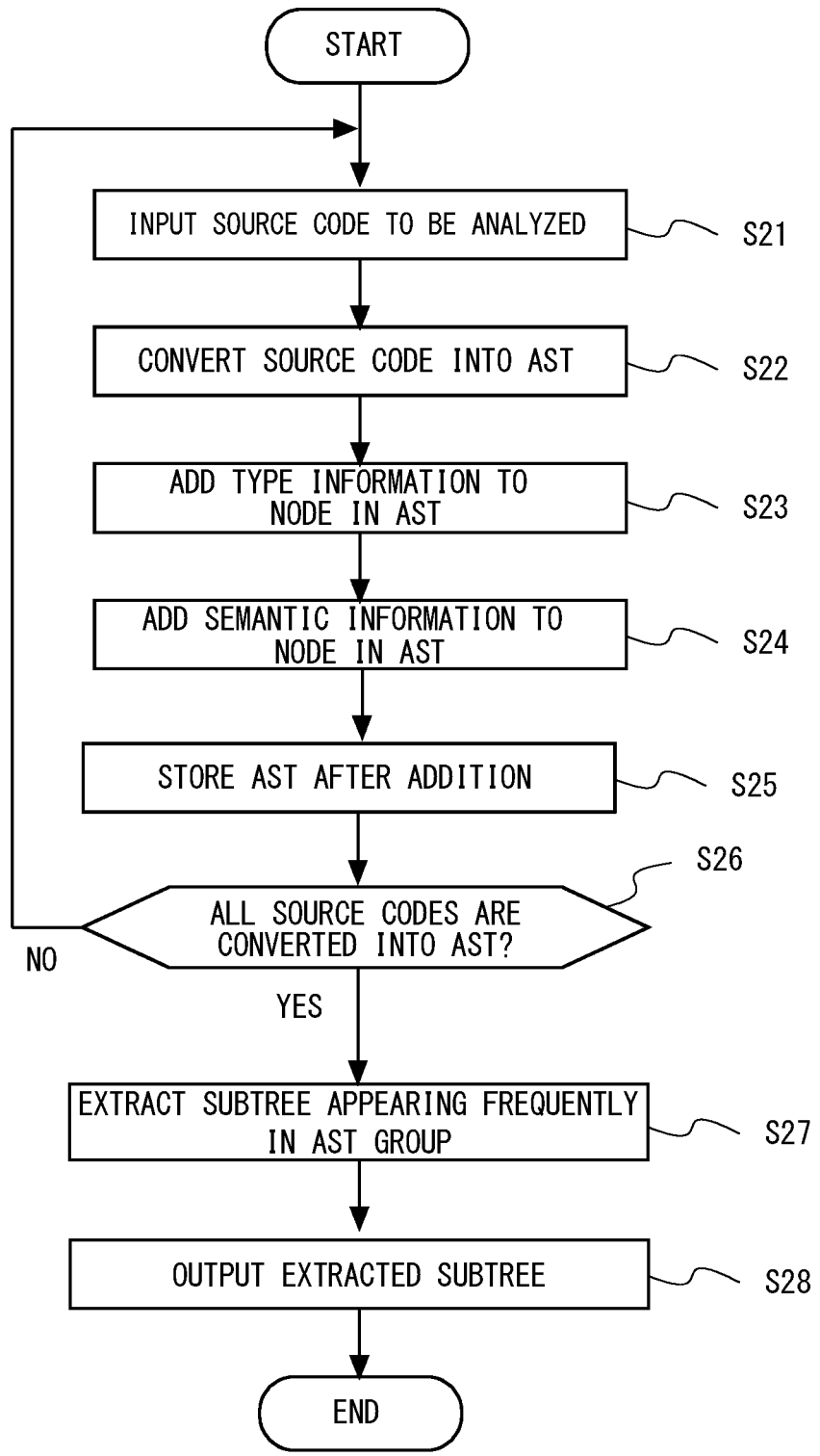
FIG. 6 is a flowchart showing the flow of a syntax tree extraction method according to the second example embodiment.

FIG. 6 is a flowchart showing the flow of a syntax tree extraction method according to the second example embodiment. First, the input unit 221 inputs a source code to be analyzed (S21). For example, the input unit 221 loads one source code (for example, the source codes 2111) that has not been converted into an AST among the source codes 2111 to 211m in the storage unit 21 from the storage unit 21 to the memory 23.

Figure 7:
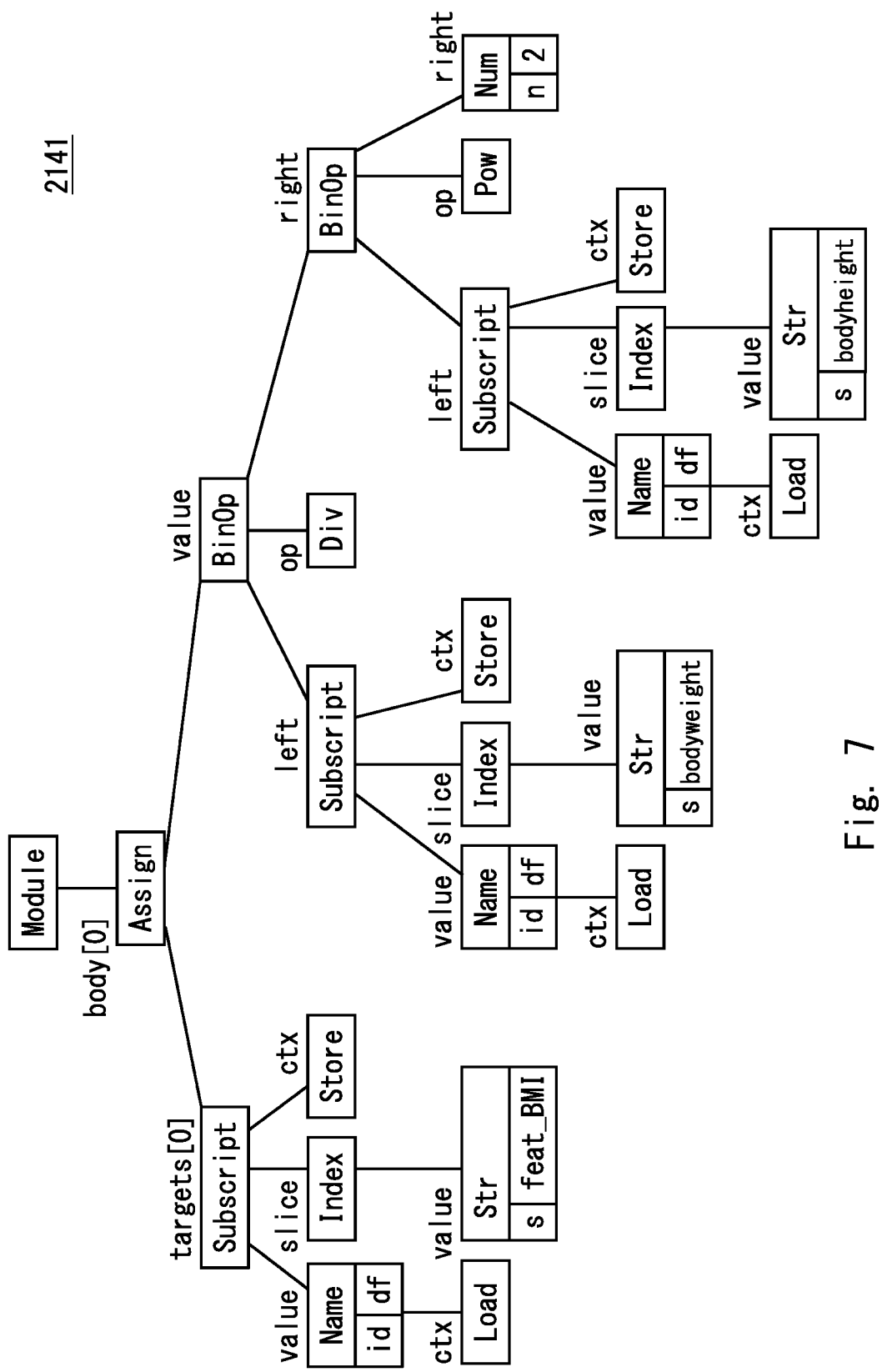
FIG. 7 is a view showing an example of an abstract syntax tree converted from a source code according to the second example embodiment.

Next, the AST conversion unit 222 converts the input source code into an AST (S22). In this example, the AST conversion unit 222 converts the source codes 2111 into the AST 2141, and stores the AST 2141 into the storage unit 21. For example, the AST conversion unit 222 may perform conversion into an AST by using Top-down parser or the like. FIG. 7 is a view showing an example of an abstract syntax tree (AST 2141) converted from the source codes 2111 (FIG. 4) according to the second example embodiment.

Referring back to FIG. 6, the type inference unit 223 then adds type information to a node in an AST (S23). In this example, the type inference unit 223 loads the AST 2141 from the storage unit 21 to the memory 23, adds the type information 2512 to each node or node group in the AST 2141, and stores it into the memory 23. For example, the type inference unit 223 identifies type information for a node group by using a static type inference technique or the like, and adds the identified type information.

Figure 8:
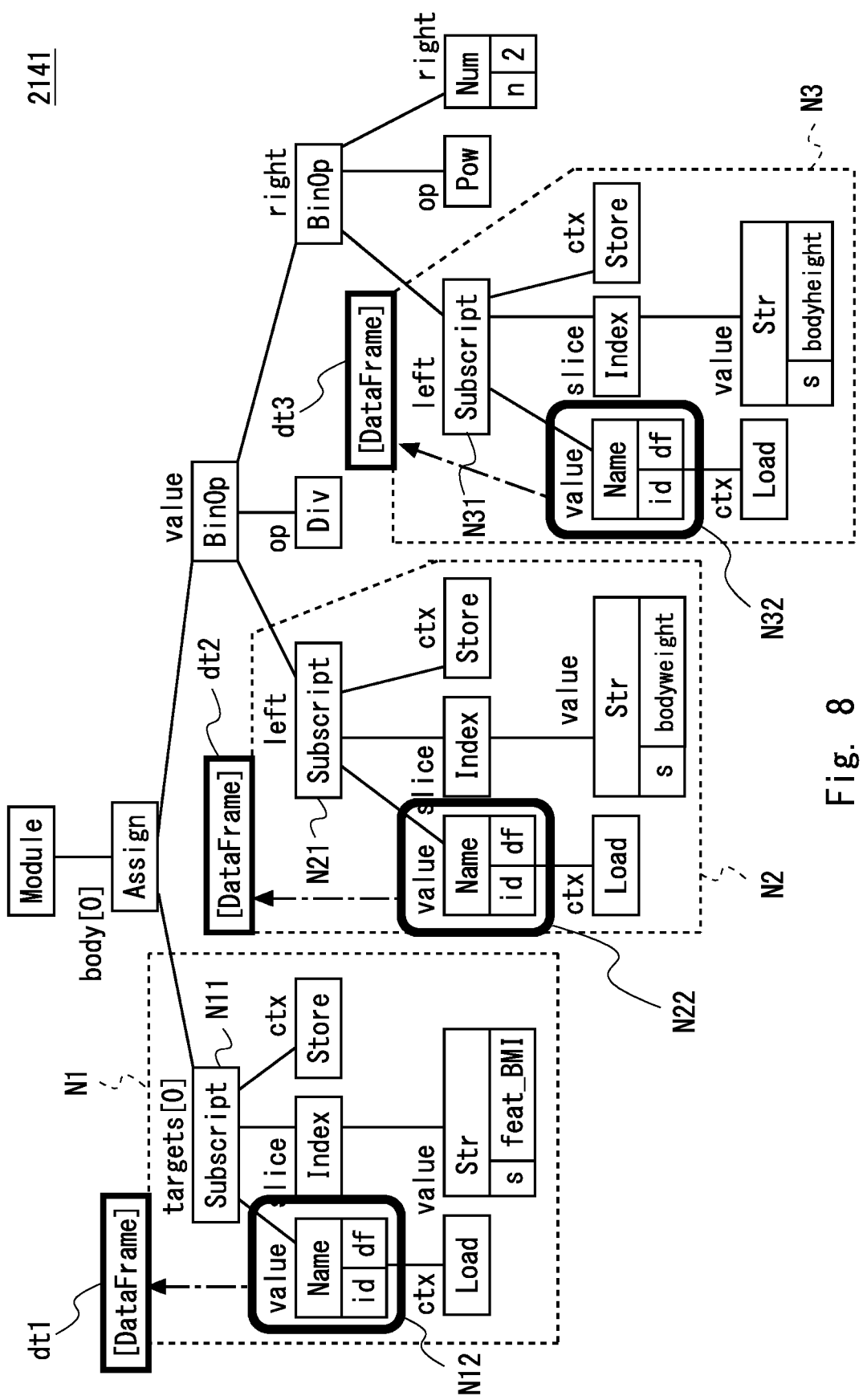
FIG. 8 is a view showing an example in which type information is added to an abstract syntax tree according to the second example embodiment.

FIG. 8 is a view showing an example in which type information is added to the abstract syntax tree (AST 2141) according to the second example embodiment. In this example, the type inference unit 223 determines a data type as "DataFrame" from a node N12 included in a node group N1, and adds the data type dt1 "DataFrame" as the attribute information of the node group N1. Likewise, the type inference unit 223 determines a data type as "DataFrame" from a node N22 included in a node group N2 and a node N32 included in a node group N3, and adds the data types dt2 and dt3 "DataFrame" as the attribute information of the node groups N2 and N3, respectively. Note that, it may be expressed that the data types dt1, dt2 and dt3 are added as the attribute information of nodes N11, N21 and N31, which are parent nodes of the node N12, N22 and N32, respectively, instead of the node groups N1, N2 and N3. Thus, the type information is added to some nodes in the AST.

Referring back to FIG. 6, the semantic inference unit 224 then adds the semantic information to a node in the AST (S24). In this example, the semantic inference unit 224 determines whether the AST 2141 update in Step S23 and held in the memory 23 is a node to which subject type information is added or not by referring to the subject type list 213. When it is a node to which subject type information is added, the semantic inference unit 224 adds the semantic information 2513 to this node, a parent node or a node group by referring to the knowledge 212, and stores it into the memory 23. For example, the semantic inference unit 224 identifies the semantic information for a node group by using the technique according to Patent Literature 3 or the like, and adds the identified semantic information.

Figure 9:
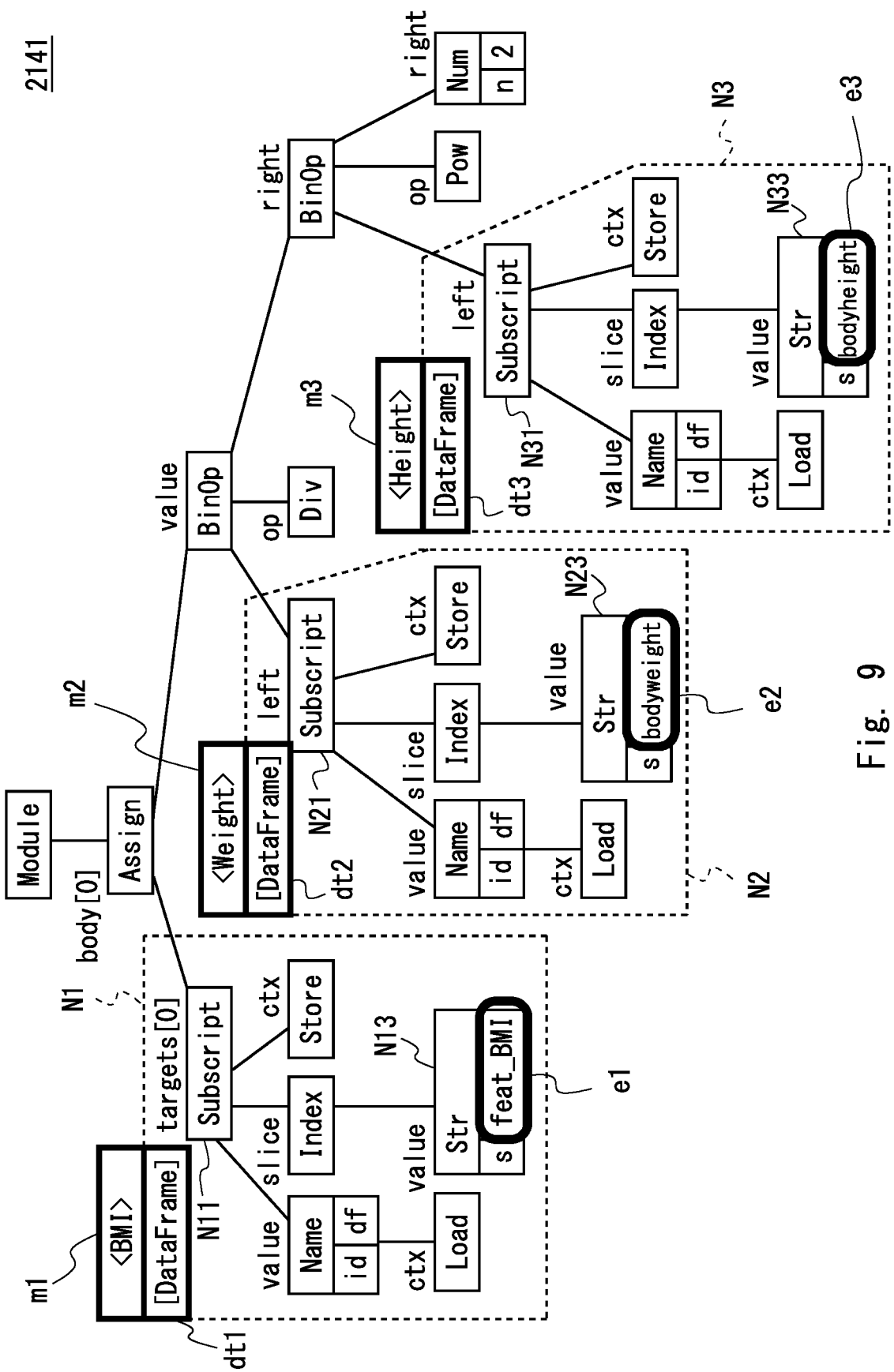
FIG. 9 is a view showing an example in which semantic information is added to an abstract syntax tree to which type information is added according to the second example embodiment.

FIG. 9 is a view showing an example in which the semantic information 2513 is added to the abstract syntax tree (AST 2141) to which the type information 2512 is added according to the second example embodiment. In this example, the semantic inference unit 224 determines that the type information 2512 added to the node group N1 or the node N11 is "Data Frame" contained in the subject type list 213. The semantic inference unit 224 then inputs the element information e1 "feat_BMI" of the node N13 included in the node group N1 to the semantic inference model in the knowledge 212 and thereby obtains the semantic information "BMI". Then, the semantic inference unit 224 sets the semantic information m1 "BMI" to the attribute information of the node group N1 or the node N11. Likewise, the semantic inference unit 224 determines that the node groups N2 and N3 are a subject data type. The semantic inference unit 224 then inputs the element information e2 "bodyweight" of the node N23 included in the node group N2 to the semantic inference model in the knowledge 212 and thereby obtains the semantic information "Weight". Then, the semantic inference unit 224 sets the semantic information m2 "Weight" to the attribute information of the node group N2 or the node N21. Further, the semantic inference unit 224 inputs the element information e3 "bodyheight" of the node N33 included in the node group N3 to the semantic inference model in the knowledge 212 and thereby obtains the semantic information "Height". Then, the semantic inference unit 224 sets the semantic information m3 "Height" to the attribute information of the node group N3 or the node N31.

Referring back to FIG. 6, the semantic inference unit 224 stores the AST 2141 held in the memory 23 into the storage unit 21 (S25). After that, the input unit 221 determines whether all of the source codes have been converted into ASTs (S26). When there remains a source code that has not been converted into an AST, the process repeats Steps S21 to S26. In this example, it is assumed that the source code 2111 has been converted into an AST, and the other source codes have not yet been converted.

Figure 10:
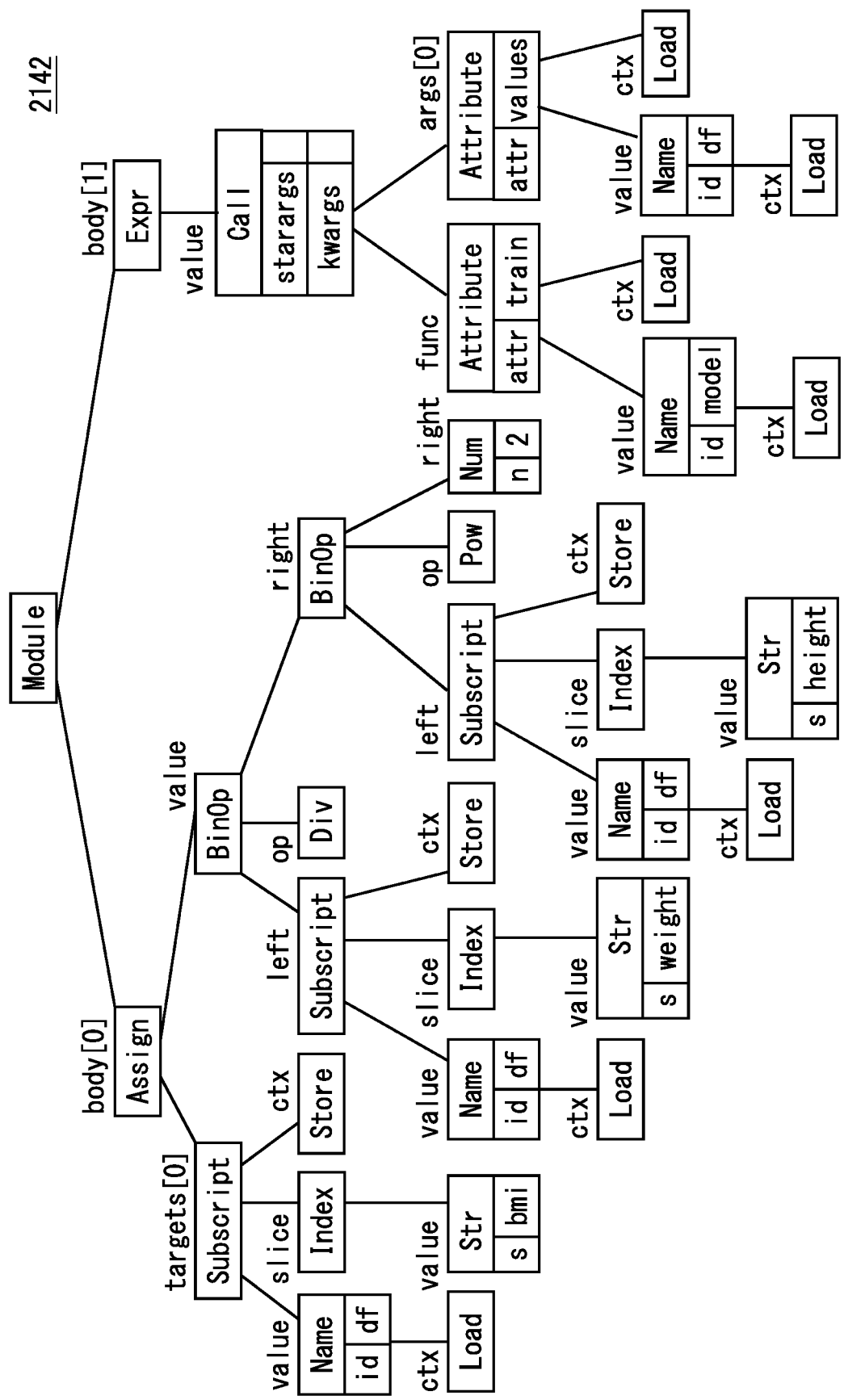
FIG. 10 is a view showing an example of an abstract syntax tree converted from another source code according to the second example embodiment.

Thus, the input unit 221 loads one source code (for example, the source code 2112) that has not been converted into an AST from the storage unit 21 to the memory 23 (S21). Then, the AST conversion unit 222 converts the source codes 2112 into the AST 2142, and stores the AST 2142 into the storage unit 21 (S22). FIG. 10 is a view showing an example of the abstract syntax tree (AST 2142) converted from the different source code 2112 (FIG. 5) according to the second example embodiment. In this manner, although the AST 2141 (FIG. 7) and 2142 (FIG. 10) partly include substantially the same processing, it is not possible to easily extract a common subtree because the character strings of the element names are different.

Then, the type inference unit 223 loads the AST 2142 from the storage unit 21 to the memory 23, adds the type information 2512 to each node or node group in the AST 2142, and stores it into the memory 23 (S23). The semantic inference unit 224 then adds the semantic information for the AST 2142 in the same manner as describe above (S24).

Figure 11:
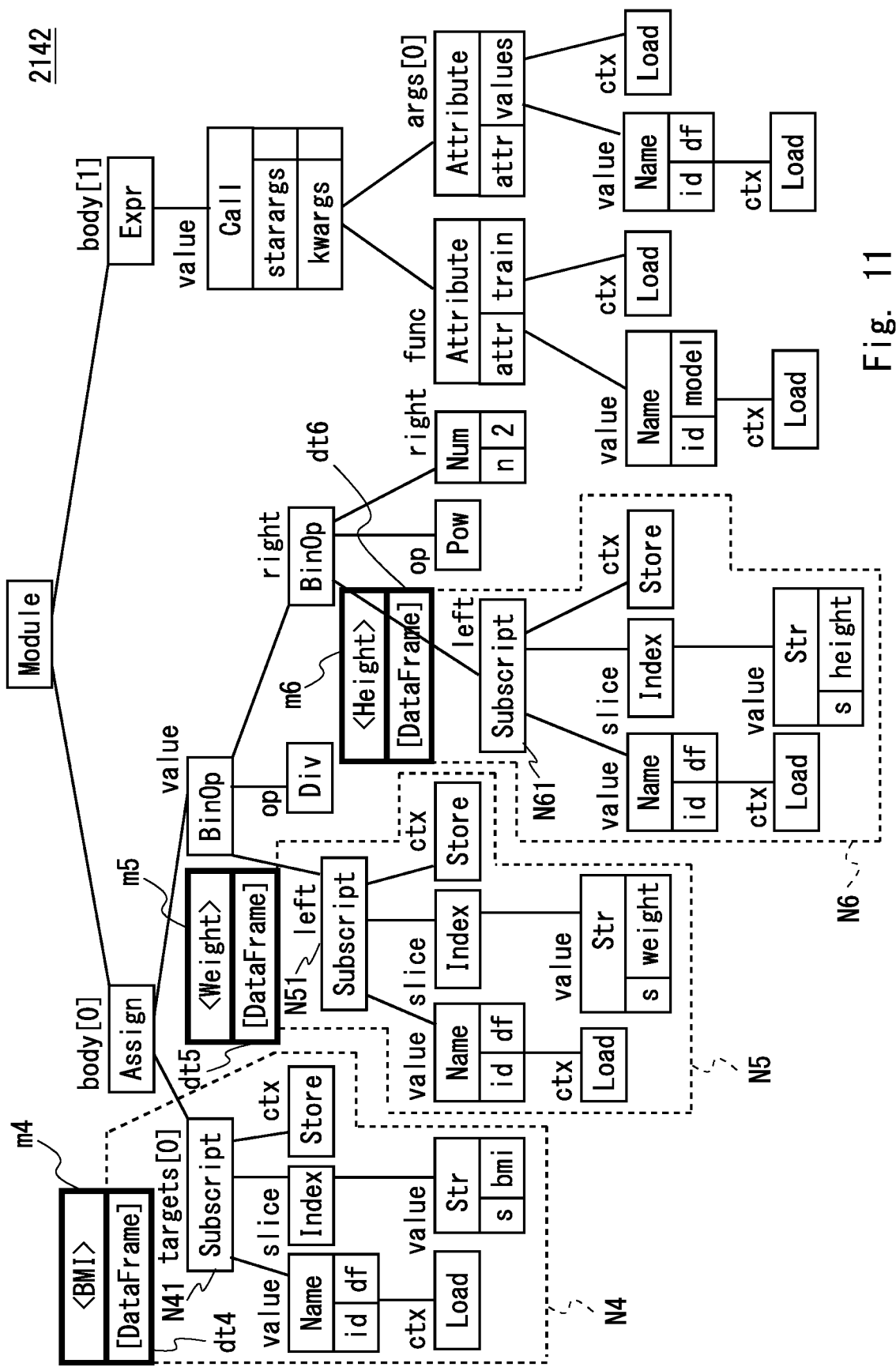
FIG. 11 is a view showing an example in which type information and semantic information are added to an abstract syntax tree converted from another source code according to the second example embodiment.

FIG. 11 is a view showing an example in which the type information 2512 and the semantic information 2513 are added to the abstract syntax tree (AST 2142) (FIG. 10) converted from the different source code 2112 according to the second example embodiment. In this example, the data types dt4, dt5, and dt6 "DataFrame" are added to the attribute information of node groups N4, N5 and N6, respectively, by the same processing as described above. Further, the semantic information m4 "BMI" is added to the attribute information of the node group N4, the semantic information m5 "Weight" is added to the attribute information of the node group N5, and the semantic information m6 "Height" is added to the attribute information of the node group N6. Note that the semantic information m4, m5 and m6 may be added to the attribute information of nodes N41, N51 and N61, respectively, instead of the node groups N4, N5 and N6.

Referring back to FIG. 6, the semantic inference unit 224 then stores the AST 2142 held in the memory 23 into the storage unit 21 (S25). After that, the input unit 221 determines whether all of the source codes have been converted into ASTs (S26). It is assumed that Steps S21 to S25 are performed in the same manner for the remaining source codes. Then, it is determined that all of the source codes have been converted into ASTs, and the process proceeds to Step S27.

The subtree extraction unit 225 extracts a subtree that appears frequently in an AST group (S27). Specifically, the subtree extraction unit 225 loads the ASTs 2141 to 214m from the storage unit 21 to the memory 23, extracts a subtree that is common to all the ASTs, and counts the number of appearances of this subtree. For example, the subtree extraction unit 225 compares the semantic information 2513 in the ASTs by using the technique according to Non Patent Literature 1, and thereby extracts a common subtree. Particularly, the subtree extraction unit 225 extracts, as a subtree, a set of nodes where the positional relationship of a plurality of semantic information is common. Note that the subtree extraction unit 225 may extract a plurality of subtrees.

Figure 12:
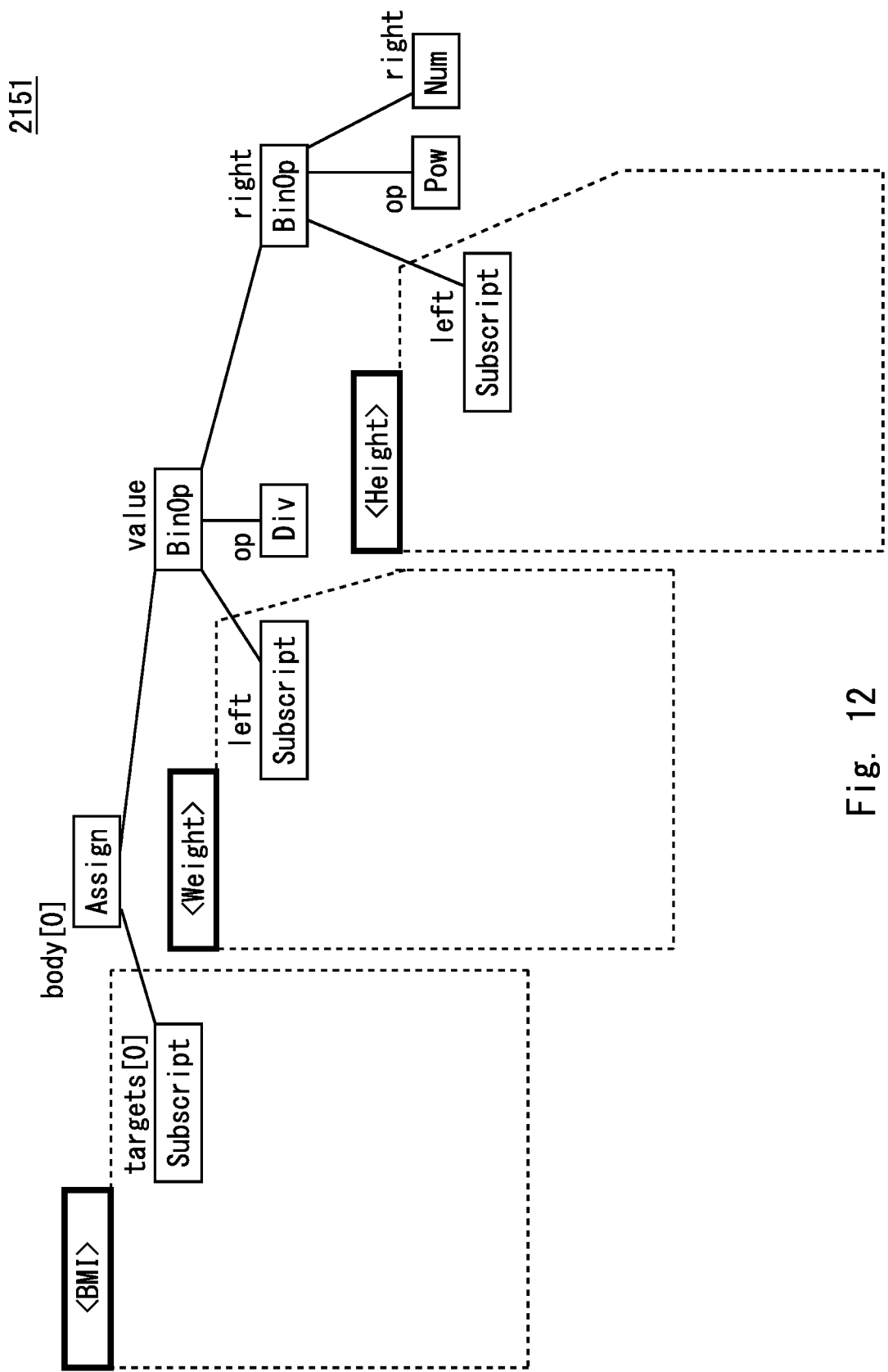
FIG. 12 is a view showing an example of a subtree common to a plurality of abstract syntax trees to which type information and semantic information are added according to the second example embodiment.

FIG. 12 is a view showing an example of a subtree common to a plurality of abstract syntax trees to which type information and semantic information are added according to the second example embodiment. It shows that a subtree 2151 is extracted because a combination of the semantic information m1, m2 and m3 and a combination of the semantic information m4, m5 and m6 are common when comparing the AST 2141 in FIG. 9 and AST 2142 in FIG. 11. Particularly, in this case, the semantic information m1 and m4 on the left-hand side of the node "Assign" are the same "BMI", and the semantic information m2 and m3 and the semantic information m5 and m6 on the right-hand side are the same "Weight" and "Height", respectively. Further, the semantic information m3 and m6 "Height" are both exponentiated (Pow).

Referring back to FIG. 6, the subtree extraction unit 225 outputs the extracted subtree (S28). For example, the subtree extraction unit 225 associates the number of appearances with each of the extracted subtrees 2151 to 215L and outputs them. A user can thereby grasp a subgraph common to a plurality of source codes in terms of the number of appearance. This enables easy identification of a subgraph that appears more frequently, which further enhances the efficiency of reuse.

As described above, in this example embodiment, when similar information is processed among a plurality of source codes, comparison is made after abstracting the processing and replacing a description of element information such as a variable name with a character string indicating the semantics of the element, and therefore substantially the same processing is extracted accurately. Specifically, by subsuming variable names (element information) described in different ways into the concept of "semantics" and thereby eliminating variants of description, efficient extraction is achieved even for a large amounts of sources codes.

Third Example Embodiment

A third example embodiment is a modified example of the above-described second example embodiment. An information processing apparatus or an analysis system according to the third example embodiment further includes a generation unit that generates an analysis rule, which corresponds to information or know-how for reuse, from the extracted subgraph. The generation unit may generate, as the analysis rule, conditional information indicating that remaining conceptual information can be derived by using some conceptual information among the plurality of conceptual information items included in the extracted subgraph. Further, the generation unit may generate, as the analysis rule, a processing code for deriving remaining conceptual information by using some conceptual information among the plurality of conceptual information items included in the extracted subgraph. This enables easy grasping of conditions to refer to a subgraph or a processing logic using abstract terms before checking the implementation of an individual source code corresponding to the subgraph.

Figure 13:
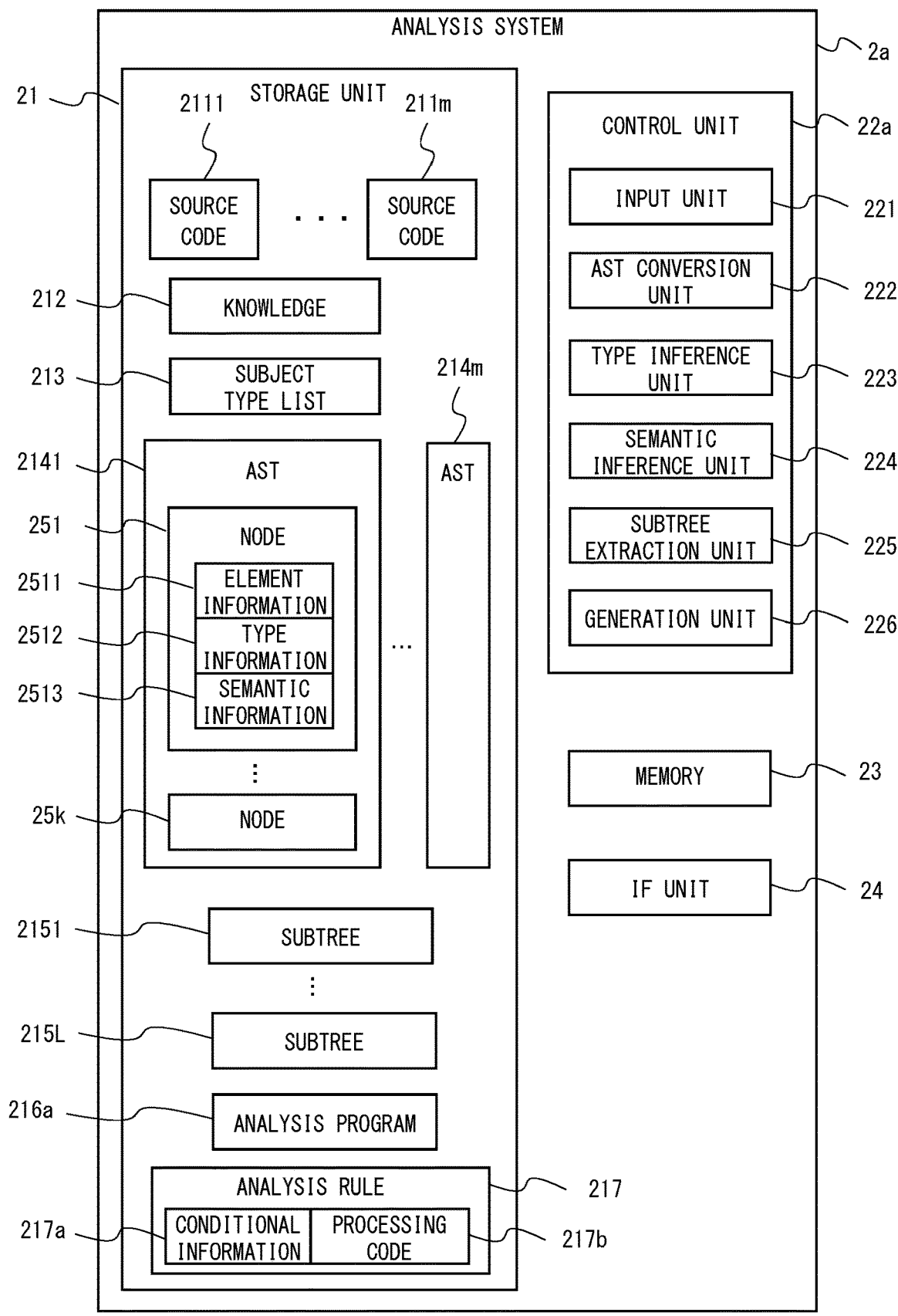
FIG. 13 is a block diagram showing the configuration of an analysis system according to a third example embodiment.

FIG. 13 is a block diagram showing the configuration of an analysis system 2a according to the third example embodiment. The analysis system 2a is a modified version of the above-described analysis system 2, and the analysis program 216 is replaced with an analysis program 216a, an analysis rule 217 is added to the storage unit 21, and a generation unit 226 is added to a control unit 22a. The other components are the same as those shown in FIG. 3, and the detailed description thereof is omitted.

The analysis program 216a is a computer program in which processing of the generation unit 226, which is described later, is implemented in addition to the functions of the analysis program 216. The analysis rule 217 includes conditional information 217a and a processing code 217b. The conditional information 217a is conditional information indicating that remaining semantic information can be derived by using some semantic information among a plurality of semantic information 2513 included in a subgraph 2151 extracted by the subtree extraction unit 225. The processing code 217b is a processing code for deriving remaining semantic information by using some semantic information among the plurality of semantic information 2513 included in the subgraph 2151 extracted by the subtree extraction unit 225.

Figure 14:
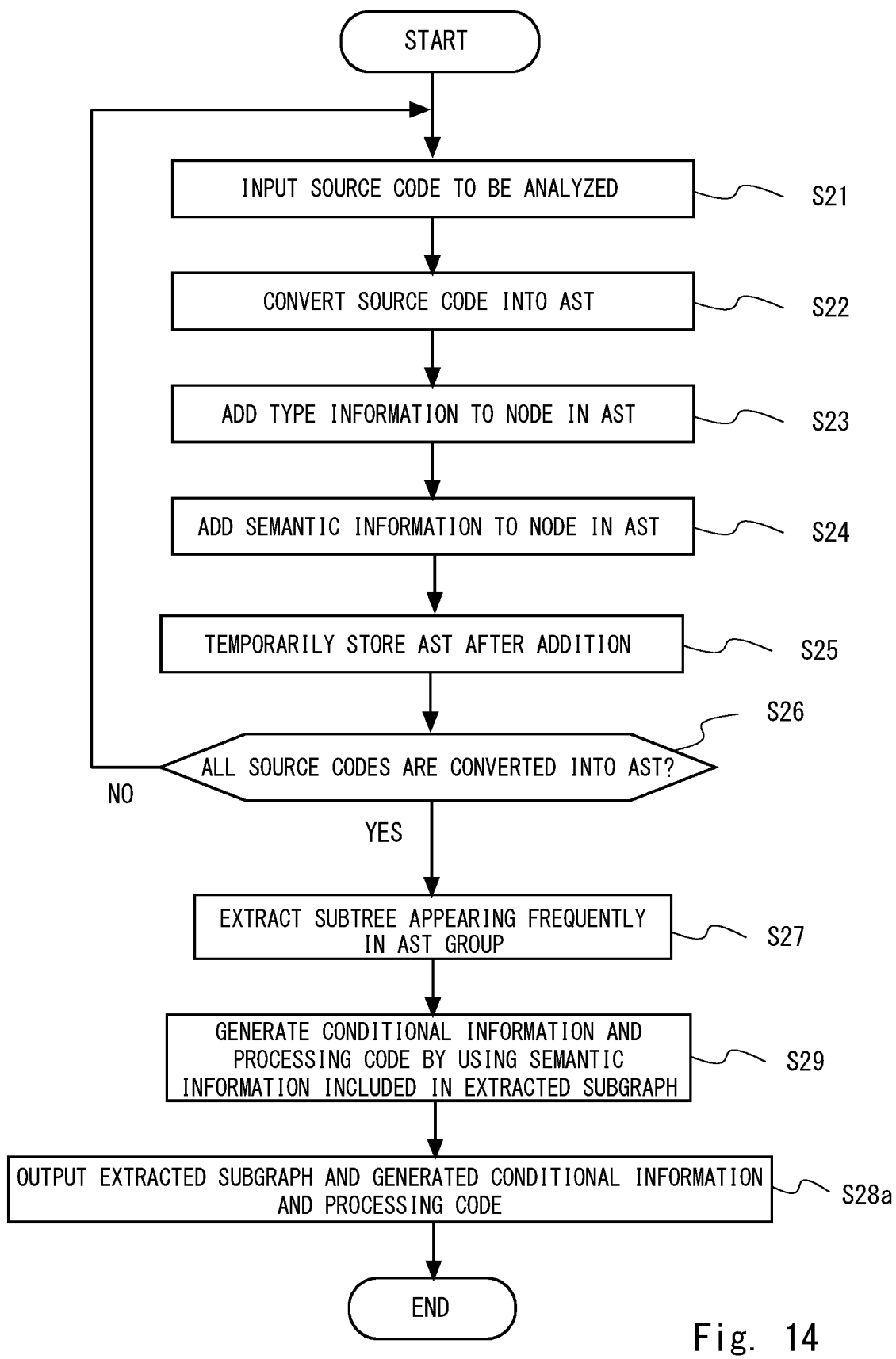
FIG. 14 is a flowchart showing the flow of an analysis rule extraction method according to the third example embodiment.

FIG. 14 is a flowchart showing the flow of an analysis rule extraction method according to the third example embodiment. Steps S21 to S27 are the same as those shown in FIG. 6 described above, and the description thereof is omitted. The generation unit 226 generates the conditional information 217a and the processing code 217b (analysis rue) by using the plurality of semantic information included in the subgraph extracted in Step S27 (S29). Then, the subtree extraction unit 225 and the generation unit 226 output the extracted subgraph 2151 and the like and the generated conditional information 217a and processing code 217b (S28a).

FIG. 15 is a view showing an example of the extracted analysis rule 217 according to the third example embodiment. The conditional information 217a is a conditional expression indicating that remaining semantic information "BMI" can be derived when having a combination of some semantic information "Weight" and "Height". The processing code 217b indicates a code of an arithmetic expression for deriving the remaining semantic information "BMI" by using the some semantic information "Weight" and "Height".

As described above, this example embodiment provides a user with information derived from the relationship of a plurality of conceptual information included in a subgraph, in addition to the advantageous effects of the first and second example embodiments. For example, this allows a user to know that, when weight and height are contained in data to be analyzed, a value "BMI" can be derived by referring to the past similar processing code. This also allows a user to grasp the overview of a processing code for deriving a value BMI by using the weight and height contained in data to be analyzed. This further promotes the reuse of existing source codes.

Other Example Embodiments

Although a hardware configuration is described in the above example embodiments, it is not limited thereto. The present disclosure may be implemented by causing a CPU (Central Processing Unit) to execute a computer program to perform given processing.

In the above-described examples, the program can be stored using any type of non-transitory computer readable media and provided to a computer. The non-transitory computer readable media include any type of tangible storage media. Examples of non-transitory computer readable media include magnetic storage media such as flexible disks, magnetic tapes or hard disks, optical magnetic storage media such as magneto-optical disks, optical disc media such as CD (Compact Disc) or DVD (Digital Versatile Disk), and semiconductor memories such as mask ROM, PROM (Programmable ROM), EPROM (Erasable PROM), flash ROM or RAM (Random Access Memory). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

Note that the present disclosure is not limited to the above-described example embodiments and can be modified as appropriate without departing from the spirit and scope of the present disclosure. Further, the present disclosure may be implemented by combining the above-described example embodiments with one another.

The whole or part of the example embodiments disclosed above can be described as, but not limited to, the following supplementary notes.

(Supplementary Note 1)

An information processing apparatus comprising:

a storage unit configured to store knowledge information containing a relationship regarding the correspondence between a plurality of types of element information to be used for referring to a specified element value and conceptual information indicating a concept of the element value;

an adding unit configured to add, to each of a plurality of graphs representing a processing structure in each of a plurality of source codes where any one of the element information is described, the conceptual information identified from the element information corresponding to each node in the graph based on the knowledge information as attribute information related to the node; and an extraction unit configured to extract a subgraph common to the graphs after the adding based on the conceptual information.

(Supplementary Note 2)

The information processing apparatus according to Supplementary Note 1, wherein, when a description in the source code contained in each node is the element information, the adding unit identifies the conceptual information associated with the element information in the knowledge information, and adds the identified conceptual information as the attribute information of any one of the node, a parent node to which the node belongs, and a node group including the node and the parent node.

(Supplementary Note 3)

The information processing apparatus according to Supplementary Note 1 or 2, wherein the element information is an attribute name described in a specified source code for referring to the element value, the conceptual information is a character string indicating semantics of the element value, the knowledge information is a semantic inference model obtained in advance by machine learning based on learning data containing a plurality of types of attribute names and the semantics and indicating regularity between the attribute name and the semantics, and the adding unit adds a character string indicating the semantics obtained by inputting the attribute name in the source code corresponding to each node to the semantic inference model as the attribute information related to the node.

(Supplementary Note 4)

The information processing apparatus according to any one of Supplementary Notes 1 to 3, wherein each of the plurality of source codes is written using a specified data structure containing the element information as an element identifiable as an attribute name, the information processing apparatus further includes a type determination unit configured to determine a data type of the data structure from each of the plurality of source codes and add type information indicating the determined data type to the attribute information related to a corresponding node, and the extraction unit extracts the subgraph while also taking the type information into consideration.

(Supplementary Note 5)

The information processing apparatus according to Supplementary Note 4, wherein the adding unit identifies the conceptual information based on a node where the type information is added by the type determination unit, and adds the identified conceptual information as the attribute information related to the node.

(Supplementary Note 6)

The information processing apparatus according to any one of Supplementary Notes 1 to 5, wherein the extraction unit extracts, as the subgraph, a set of nodes where a positional relationship of a plurality of conceptual information items added as the attribute information is common to the graphs after the adding.

(Supplementary Note 7)

The information processing apparatus according to Supplementary Note 6, further comprising:

a generation unit configured to generate conditional information indicating that remaining conceptual information is derivable by using some conceptual information among the plurality of conceptual information items included in the extracted subgraph.

(Supplementary Note 8)

The information processing apparatus according to Supplementary Note 6, further comprising:

a generation unit configured to generate a processing code for deriving remaining conceptual information by using some conceptual information among the plurality of conceptual information items included in the extracted subgraph.

(Supplementary Note 9)

The information processing apparatus according to any one of Supplementary Notes 1 to 8, wherein the extraction unit counts the number of appearances of the subgraph in the plurality of graphs.

(Supplementary Note 10)

The information processing apparatus according to any one of Supplementary Notes 1 to 9, wherein each of the plurality of graphs is an abstract syntax tree generated from each of the plurality of source codes.

(Supplementary Note 11)

An analysis system comprising:

a storage apparatus configured to store knowledge information containing a relationship regarding the correspondence between a plurality of types of element information to be used for referring to a specified element value and conceptual information indicating a concept of the element value;

an adding unit configured to add, to each of a plurality of graphs representing a processing structure in each of a plurality of source codes where any one of the element information is described, the conceptual information identified from the element information corresponding to each node in the graph based on the knowledge information as attribute information related to the node; and an extraction unit configured to extract a subgraph common to the graphs after the adding based on the conceptual information.

(Supplementary Note 12)

The analysis system according to Supplementary Note 11, wherein, when a description in the source code contained in each node is the element information, the adding unit identifies the conceptual information associated with the element information in the knowledge information, and adds the identified conceptual information as the attribute information of any one of the node, a parent node to which the node belongs, and a node group including the node and the parent node.

(Supplementary Note 13)

The analysis system according to Supplementary Note 11 or 12, wherein the extraction unit extracts, as the subgraph, a set of nodes where a positional relationship of a plurality of conceptual information items added as the attribute information is common to the graphs after the adding.

(Supplementary Note 14)

An analysis method performed by a computer, the analysis method comprising:

adding, to each of a plurality of graphs representing a processing structure in each of a plurality of source codes where any one of a plurality of types of element information to be used for referring to a specified element value is described, based on knowledge information containing a relationship regarding the correspondence between the plurality of types of element information and conceptual information indicating a concept of the element value, the conceptual information identified from the element information corresponding to each node in the graph as attribute information related to the node; and extracting a subgraph common to the graphs after the adding based on the conceptual information.

(Supplementary Note 15)

A non-transitory computer readable medium storing an analysis program causing a computer to execute:

processing of adding, to each of a plurality of graphs representing a processing structure in each of a plurality of source codes where any one of a plurality of types of element information to be used for referring to a specified element value is described, based on knowledge information containing a relationship regarding the correspondence between the plurality of types of element information and conceptual information indicating a concept of the element value, the conceptual information identified from the element information corresponding to each node in the graph as attribute information related to the node; and processing of extracting a subgraph common to the graphs after the adding based on the conceptual information.

REFERENCE SIGNS LIST

1 INFORMATION PROCESSING APPARATUS
2 STORAGE UNIT
111 KNOWLEDGE INFORMATION
1111 ELEMENT INFORMATION
111n ELEMENT INFORMATION
1110 CONCEPTUAL INFORMATION
12 ADDING UNIT
13 EXTRACTION UNIT
2 ANALYSIS SYSTEM
2a ANALYSIS SYSTEM
21 STORAGE UNIT
2111 SOURCE CODE
2112 SOURCE CODE
211m SOURCE CODE
212 KNOWLEDGE
213 SUBJECT TYPE LIST
2141 AST
251 NODE
2511 ELEMENT INFORMATION
2512 TYPE INFORMATION
2513 SEMANTIC INFORMATION
25k NODE
2142 AST
214m AST
2151 SUBTREE
215L SUBTREE
216 ANALYSIS PROGRAM
216a ANALYSIS PROGRAM
217 ANALYSIS RULE
217a CONDITIONAL INFORMATION
217b PROCESSING CODE
22 CONTROL UNIT
22a CONTROL UNIT
221 INPUT UNIT
222 AST CONVERSION UNIT
223 TYPE INFERENCE UNIT
224 SEMANTIC INFERENCE UNIT
225 SUBTREE EXTRACTION UNIT
226 GENERATION UNIT
23 MEMORY
24 IF UNIT
C1 SUBJECT CODE
C2 SUBJECT CODE
N1 NODE GROUP
N11 NODE
N12 NODE
N13 NODE
dt1 DATA TYPE
m1 SEMANTIC INFORMATION
e1 ELEMENT INFORMATION
N2 NODE GROUP
N21 NODE
N22 NODE
N23 NODE
dt2 DATA TYPE
m2 SEMANTIC INFORMATION
e2 ELEMENT INFORMATION
N3 NODE GROUP
N31 NODE
N32 NODE
N33 NODE
dt3 DATA TYPE
m3 SEMANTIC INFORMATION
e3 ELEMENT INFORMATION
N4 NODE GROUP
N41 NODE
dt4 DATA TYPE
m4 SEMANTIC INFORMATION
N5 NODE GROUP
N51 NODE
dt5 DATA TYPE
m5 SEMANTIC INFORMATION
N6 NODE GROUP
N61 NODE
dt6 DATA TYPE
m6 SEMANTIC INFORMATION

What is claimed is:

1. An information processing apparatus comprising:
at least one memory storing instructions, and
at least one processor configured to execute the instructions to:
store knowledge information containing a relationship regarding the correspondence between a plurality of types of element information to be used for referring to a specified element value and conceptual information indicating a concept of the element value;
add, to each of a plurality of graphs representing a processing structure in each of a plurality of source codes where any one of the element information is described, the conceptual information identified from the element information corresponding to each node in the graph based on the knowledge information as attribute information related to the node; and
extract a subgraph common to the graphs after the adding based on the conceptual information.

2. The information processing apparatus according to claim 1, wherein the at least one processor further configured to execute the instructions to, when a description in the source code contained in each node is the element information, identify the conceptual information associated with the element information in the knowledge information, and add the identified conceptual information as the attribute information of any one of the node, a parent node to which the node belongs, and a node group including the node and the parent node.

3. The information processing apparatus according to claim 1, wherein
the element information is an attribute name described in a specified source code for referring to the element value,
the conceptual information is a character string indicating semantics of the element value,
the knowledge information is a semantic inference model obtained in advance by machine learning based on learning data containing a plurality of types of attribute names and the semantics and indicating regularity between the attribute name and the semantics, and
the at least one processor further configured to execute the instructions to add a character string indicating the semantics obtained by inputting the attribute name in the source code corresponding to each node to the semantic inference model as the attribute information related to the node.

4. The information processing apparatus according to claim 1, wherein
each of the plurality of source codes is written using a specified data structure containing the element information as an element identifiable as an attribute name, and
the at least one processor further configured to execute the instructions to determine a data type of the data structure from each of the plurality of source codes,
add type information indicating the determined data type to the attribute information related to a corresponding node, and
extract the subgraph while also taking the type information into consideration.

5. The information processing apparatus according to claim 4, wherein
the at least one processor further configured to execute the instructions to identify the conceptual information based on a node where the type information is added, and add the identified conceptual information as the attribute information related to the node.

6. The information processing apparatus according to claim 1, wherein the at least one processor further configured to execute the instructions to extract, as the subgraph, a set of nodes where a positional relationship of a plurality of conceptual information items added as the attribute information is common to the graphs after the adding.

7. The information processing apparatus according to claim 6, wherein
the at least one processor further configured to execute the instructions to generate conditional information indicating that remaining conceptual information is derivable by using some conceptual information among the plurality of conceptual information items included in the extracted subgraph.

8. The information processing apparatus according to claim 6, wherein
the at least one processor further configured to execute the instructions to generate a processing code for deriving remaining conceptual information by using some conceptual information among the plurality of conceptual information items included in the extracted subgraph.

9. The information processing apparatus according to claim 1, wherein the at least one processor further configured to execute the instructions to count the number of appearances of the subgraph in the plurality of graphs.

10. The information processing apparatus according to claim 1, wherein each of the plurality of graphs is an abstract syntax tree generated from each of the plurality of source codes.

11. An analysis method performed by a computer, the analysis method comprising:
adding, to each of a plurality of graphs representing a processing structure in each of a plurality of source codes where any one of a plurality of types of element information to be used for referring to a specified element value is described, based on knowledge information containing a relationship regarding the correspondence between the plurality of types of element information and conceptual information indicating a concept of the element value, the conceptual information identified from the element information corresponding to each node in the graph as attribute information related to the node; and
extracting a subgraph common to the graphs after the adding based on the conceptual information.

12. A non-transitory computer readable medium storing an analysis program causing a computer to execute:
processing of adding, to each of a plurality of graphs representing a processing structure in each of a plurality of source codes where any one of a plurality of types of element information to be used for referring to a specified element value is described, based on knowledge information containing a relationship regarding the correspondence between the plurality of types of element information and conceptual information indicating a concept of the element value, the conceptual information identified from the element information corresponding to each node in the graph as attribute information related to the node; and
processing of extracting a subgraph common to the graphs after the adding based on the conceptual information.

* * * * *